Figure 3:
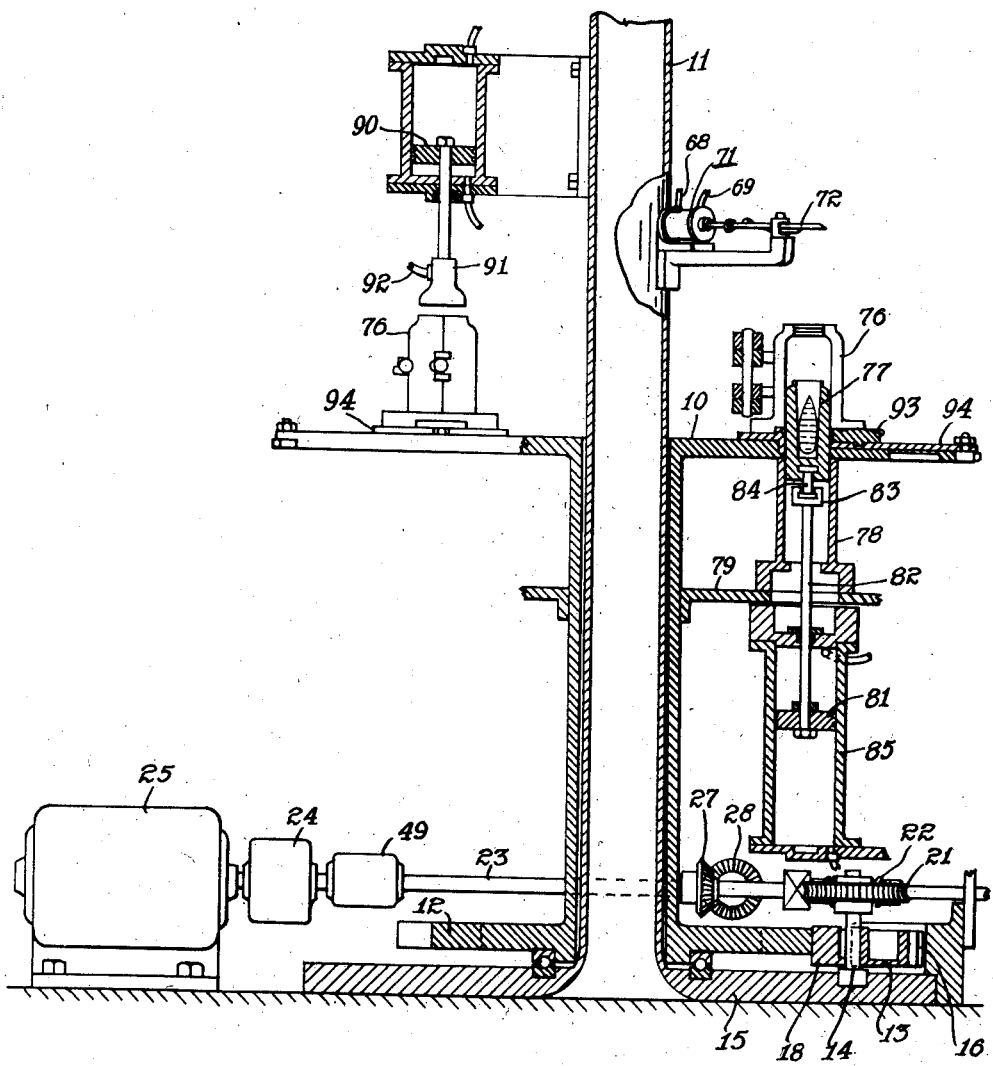

May 26, 1942.　　　　S. D. BERT　　　　2,284,508
GLASS FORMING MACHINE
Filed June 5, 1940　　　5 Sheets-Sheet 1
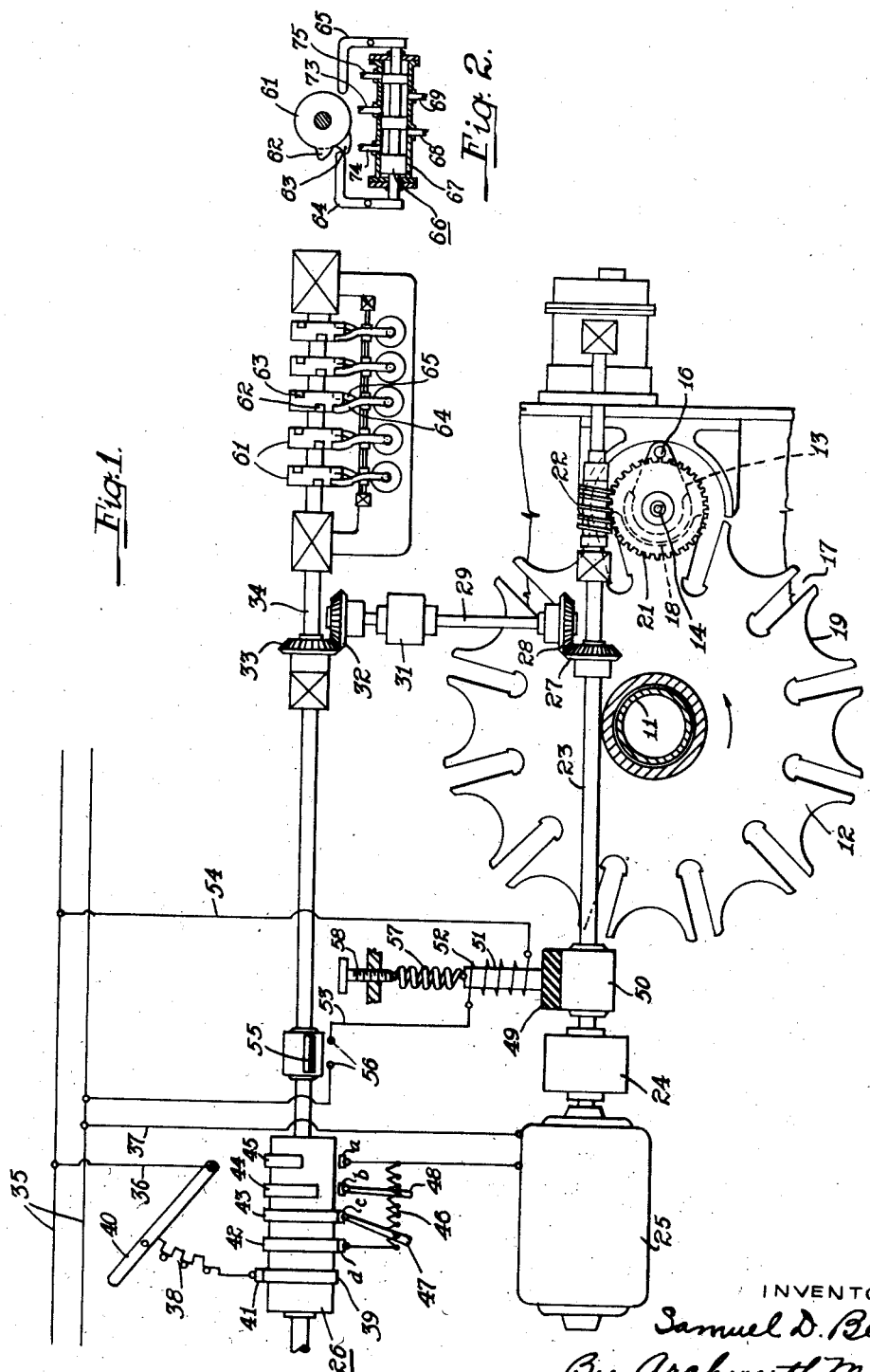
INVENTOR
Samuel D. Bert
By Archworth Martin
His Attorney May 26, 1942.  S. D. BERT  2,284,508
GLASS FORMING MACHINE
Filed June 5, 1940  5 Sheets-Sheet 3

INVENTOR
Samuel D. Bert
By Archworth Martin
His Attorney

May 26, 1942. S. D. BERT 2,284,508
GLASS FORMING MACHINE
Filed June 5, 1940 5 Sheets-Sheet 4

INVENTOR
Samuel D. Bert
By Archworth Martin
His Attorney

May 26, 1942.　　　　S. D. BERT　　　　2,284,508
GLASS FORMING MACHINE
Filed June 5, 1940　　　　5 Sheets-Sheet 5

INVENTOR
Samuel D. Bert
By Archworth Martin
His Attorney

Patented May 26, 1942

2,284,508

UNITED STATES PATENT OFFICE 2,284,508

GLASS-FORMING MACHINE

Samuel D. Bert, Washington, Pa., assignor of one-third to Maurice A. Yorkin and one-third to James D. Martin, Washington, Pa.

Application June 5, 1940, Serial No. 338,910

9 Claims. (Cl. 49—10)

My invention relates to glass-forming machines and is herein described as applied to that type of machine wherein intermittent rotative movements are applied to a table which carries the molds, and wherein the charges of glass are subjected to pressing and blowing operations, or to both pressing and blowing. Certain features of the invention are also applicable to continuously moving tables or carriers which it is desired to drive at various rates of speed during each complete cycle of travel.

Glass-forming machines of the intermittently moving type are commonly driven by a driving member that rotates at a constant number of revolutions per minute, so that the periods of pause or dwell are sometimes longer than necessary, with consequent danger of forming imperfect ware and always with a slower production rate than is required. Also, in some instances where the periods of dwell are of proper duration, the table is moved too slowly when bringing successive molds into working position beneath a press head or blowhead, with resultant slower production of ware.

My invention has for one of its objects the provision of means whereby the driving mechanism for a mold table can be operated at a maximum speed, with proper periods of "dwell" for the performing of glass-shaping operations.

Another object of my invention is to provide means whereby a constantly rotatable table-driving member will automatically be rotated more rapidly when moving the table from one dwell point to the next, than during the periods of dwell.

Still another object of my invention is to provide driving mechanism for an intermittently movable table which can readily be varied to properly proportion the duration of dwell relative to the periods of movement, and whereby changes as between the dwell periods and the moving periods can be readily effected.

A further object of my invention is to provide apparatus of the character referred to wherein a constantly-moving driving motor therefor is operated at automatically varied rates of speed in predetermined relation to the operation of the various glass-shaping devices.

Another object of my invention is to provide an automatically operable brake for retarding the movement of an electric motor when the controller is moving from a point of minimum resistance to a point at which further resistance is introduced into the motor circuit, thereby to effect quicker deceleration of the motor.

Figure 4:
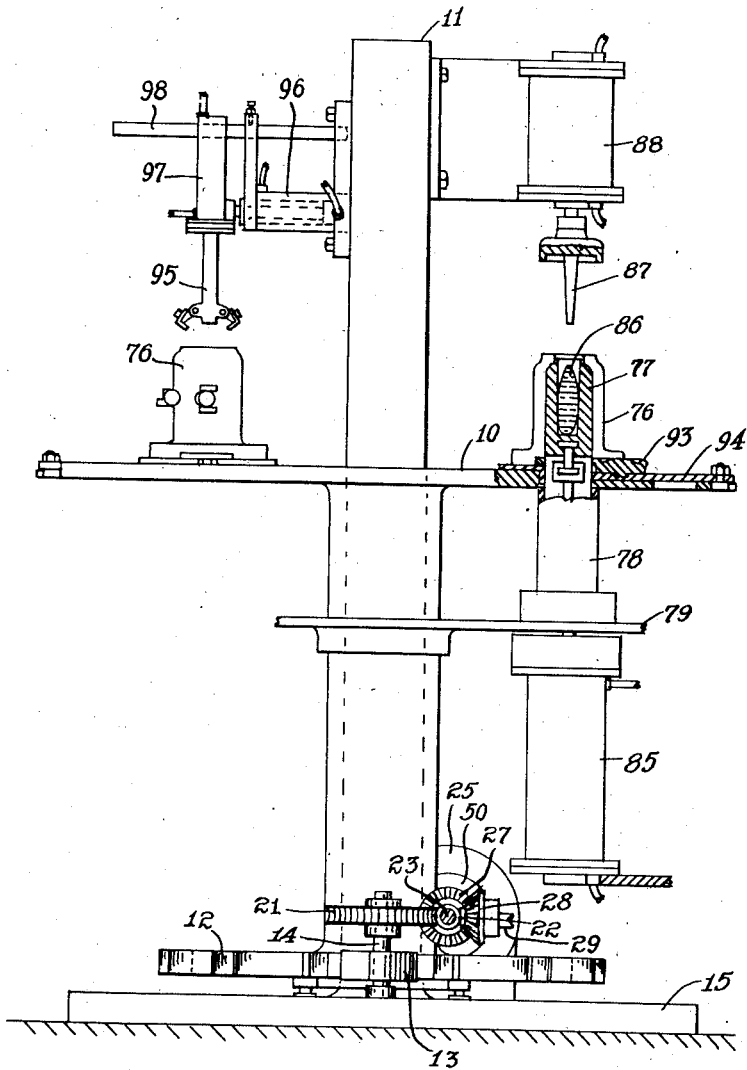
Figure 6:
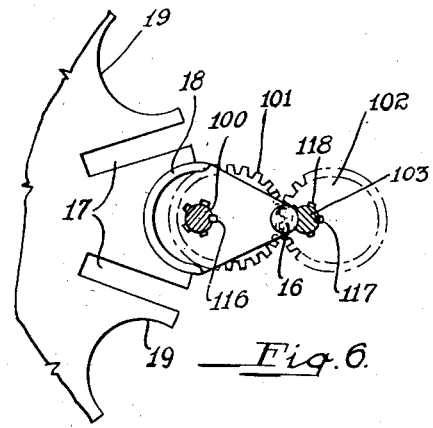
Figure 7:
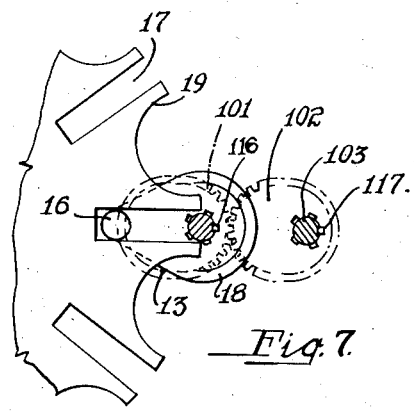
Figure 5:
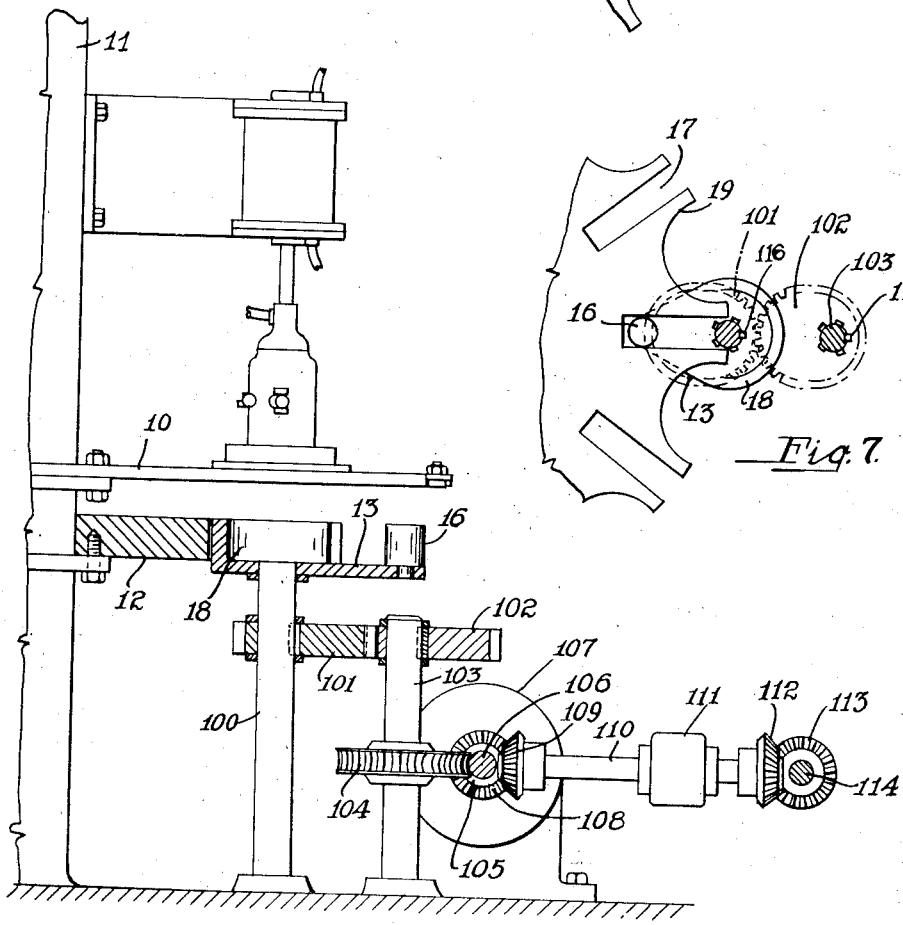
Figures 8, 9:
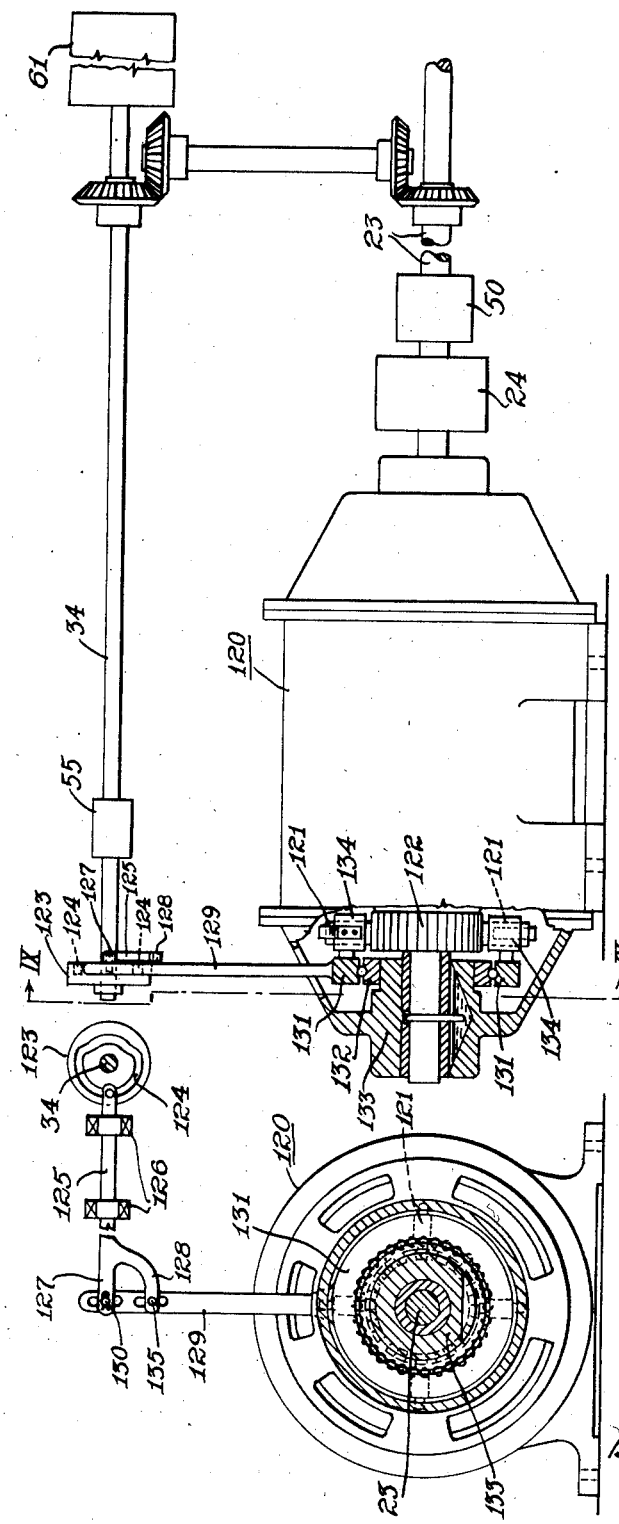

Some of the forms which my invention may take are shown in the accompanying drawings wherein Figure 1 is a schematic plan view with portions of the molding apparatus partly in section, and showing the driving and control mechanism for the molding machine and the glass-shaping elements; Fig. 2 is a sectional view showing one of the timer valves of Fig. 1; Fig. 3 is a vertical sectional view through the glass-forming machine to which the driving apparatus is applied; Fig. 4 is another sectional view through the machine, in a different vertical plane than that of Fig. 3; Fig. 5 shows a modification of the driving apparatus of Fig. 1; Fig. 6 is a schematic plan view of a portion of the structure of Fig. 5; Fig. 7 is a schematic plan view showing the parts of Fig. 6 in another position, and Figs. 8 and 9 are views showing a modification of the motor control apparatus of Fig. 1.

Referring first to Figs. 1 to 4, the driving apparatus is shown as applied to a machine of the press and blow type, such as that described in the U. S. patent to Frederick No. 975,758, to which reference may be made for a more detailed description of the operation of certain of the parts. In the present instance, a mold-carrying table 10 is rotatably mounted upon a stationary column 11 and carries at its lower end a Geneva gear wheel 12. A Geneva pinion 13 is mounted upon a shaft 14 that is journaled in the stationary base 15 which supports the column 11 of the mold table. The pinion 13 has the usual tooth 16 which, as the shaft 14 is rotated, periodically enters the slots 17 in the Geneva gear wheel 12 to impart rotative movements to the gear wheel. The Geneva pinion is also provided with the usual arcuate or curved boss 18 that enters the curved recess 19 in the edge of the gear wheel 12, to maintain the mold table stationary after the tooth 16 has passed out of one of the slots 17 and until the tooth enters a succeeding slot.

At its upper end, the shaft 14 carries a worm wheel 21 with which meshes a worm 22 that is carried by a worm shaft 23. The shaft 23 is driven through a gear reduction unit 24 from an electric motor 25. The motor 25 is constantly driven, but the speed thereof is varied by a controller 26 which also is constantly rotated. The controller 26 is driven from the shaft 23 through bevel gear wheels 27 and 28 that are respectively secured to the shaft 23 and a shaft 29. The shaft 29, through a reduction unit 31, drives a pinion 32 which meshes with a gear wheel 33 that is secured to a timer shaft 34 that carries the controller drum 26. The shaft 34 makes one revolution during each revolution of the Geneva pinion 13.

Electrical current for the motor is supplied from a line 35 through conductors 36 and 37, the conductor 36 being connected through a rheostat 38 and the controller 26 to the motor. The lever 40 of the rheostat 38 is manually adjustable and serves as a switch member, in a manner usual with devices of this character. The controller has a conductor ring 39 that is in constant engagement with a brush 41 and current flows through the controller and suitable conducting elements therein, to a desired number of contact segments such as 42, 43, 44 and 45. The segments 43, 44 and 45 are successively brought into engagement with cooperating brushes or contacts a, b and c, it being permissible to have the member 42 continuously in engagement with the contact member d. A resistance 46 is provided and contact members b and c have engagement therewith through rheostat arms 47 and 48 that are independently movable along contact points on the resistor 46. The brush member d has direct connection with the resistance 46. As the controller 26 turns, the segments 43, 44 and 45 are successively brought into engagement with their associated contact or brush members c, b and a respectively, to gradually reduce the resistance at 46, in the motor circuit, and similarly the controller segments will successively pass out of engagement with their contact members to gradually introduce resistance into the motor circuit, so that the speed of the motor will be reduced. The levers 47 and 48 are moved to desired points along the resistor 46, so that the resistance offered to current flow when the members 43 and 44 respectively are in the motor circuit can be adjusted, to effect further variations in motor speed at desired stages in a cycle of machine operation.

In order to quickly reduce the speed of the motor when the contact member 45 passes out of engagement with the brush or contact member 47, I employ a magnetically-operated brake which comprises a brake shoe 49 of non-magnetic material that is pressed into engagement with a brake drum 50 on the shaft 23. The brake shoe 49 is carried by a solenoid core 51 that is actuated by a magnetic coil 52, the coil being periodically supplied with energy through conductors 53 and 54, from the line 35. The circuit is periodically opened and closed through the conductor 53 by a switch member 55 that is carried by and rotates with the shaft 34, the member 55 being periodically brought into bridging engagement with contact members 56 immediately after the controller segment 45 passes out of engagement with the contact member 47. The degree of magnetically-applied braking pressure, and consequently the extent of reduction in speed of the motor, is adjusted by means of a tension spring 57 and its adjusting screw 58. The switch member 55 closes the circuit through the coil 52 immediately after the stud 16 of the Geneva pinion has passed out of each of the slots 17, at which time the motor is no longer actually rotating the mold table and hence tends to turn too fast during the dwell period of the mold table. In some instances the brake can be dispensed with and control of motor speed effected simply through the controller and the resistance 46—as for example where the motor is employed for driving a continuously-movable machine at varied rates of speed.

The timing of the controller relative to the Geneva drive can be adjusted so that instead of the segment 45, for example, passing out of engagement with the brush a when the Geneva pinion 16 is leaving a slot 17, with consequent initiation of a reduction in speed, it can be caused to pass from the contact member a at an earlier or a later period, depending upon the rate at which it is desired to move the Geneva pinion to its next position. Similarly, the timing of the segments 44 and 43 can be changed. This adjustment of timing can be effected by rotatably adjusting the controller drum, the brushes or the segments circumferentially of the shaft 34. Similarly, the switch member 55 will be adjusted about the axis of the shaft 34, and it will be in circuit-closing position when the segment 45 passes out of engagement with contact member a.

The timer shaft 34 carries a series of cam discs 61 for controlling flow of air pressure to the operating cylinders of various glass-shaping elements which will be hereinafter described. Each camming disc 61 carries a pair of camming lugs 62 and 63 that, through pivotally-mounted levers 64 and 65 respectively, operate a slide valve 66 within a valve chamber 67 by sliding the valve from one end to the other of the valve chamber. Thus one of the valve chambers will have connection through pipes 68 and 69 with opposite ends of a cylinder such as the shear-operating cylinder 71 (Fig. 3) that operates shears 72 to cut off charges of glass from a feeding device and permits such charges to fall into a mold.

As shown in Fig. 2, fluid pressure is supplied to the valve chamber through a pipe 73 from a suitable source of pressure and through the line 69 to the outer end of the cylinder 71, the exhaust from said cylinder taking place through the pipe 68 and a pipe or port 74. When the camming lug 62 has moved its lever 64 to shift the valve 66 to its opposite position, communication will be established from the pressure line 73 through the pipe 68 to the inner end of the cylinder 71, and since the exhaust port 74 is then closed, exhaust from the outer end of the cylinder 71 will take place through the line 69 and an exhaust port 75.

Referring now more particularly to Fig. 3, a portion of a blow mold 76 is shown in section in position after it has passed beneath the shear 72, and a press mold 77 is shown as being pushed upwardly into the mold 76, preparatory to pressing a charge of glass. There is a press mold 77 provided for each blow mold and these press molds are normally carried within tubular receptacles 78 that are mounted on a shelf 79 that turns with the mold table. A piston 81 is provided for raising and lowering the press molds. The piston rod 82 carries a hook 83 at its upper end for engagement with the head of a stud 84 that is secured to the press mold 77, the hooked engagement between the members 83 and 84 occurring when each press mold approaches glass-receiving position, as in the said Frederick Patent 975,758, for example. Air is periodically admitted to the upper and lower ends of the cylinder 85, by operation of one of the timer valves heretofore referred to, in order to effect raising and lowering movements of the press mold 77 just previous to and immediately following a pressing operation.

As shown in Fig. 4, the press mold 77 is in raised position for pressing of the glass charge 86 by a pressing plunger 87, which is moved up and down by a piston within a cylinder 88. Admission and exhaust of fluid pressure to the ends of the cylinder 88 are effected by a timer valve operated from the timer shaft 34, as described in connection with the description of Fig. 2. The operations of the timing valves are effected during dwell periods of the mold table, this method of operation being possible because the timer shaft 34 is constantly rotated. Thus when the table comes to rest, pressure is admitted to the upper side of the cylinder 88 to force the plunger 87 downwardly, and is then admitted to the lower end of the piston to raise the plunger, another movement of the table then taking place.

In a similar manner, the timing mechanism controls the operation of a piston 90 that carries a blow head 91 into which blowing air is admitted through a line 92. Previous to movement of the molds from pressing position to blowing position, the press mold 77 is withdrawn and during such movement the blow mold bottoms 93 are slid into place beneath the lower open end of the mold 76 by shifting of their supporting plates 94 in some such manner as that described in the said Fredrick patent. As each mold comes to rest at its blowing station, the timer admits air to the upper side of the piston 90 to effect downward movement of the blow head, and blowing air is admitted through the pipe 92 during this dwell period of the mold table.

When the molds reach the take-out position, they are opened in any suitable manner and take-out tongs 95 are brought into position above the mold, by a piston operating within a cylinder 96. A cylinder 97 which carries the tongs 95 is slidably supported upon a rod 98, and when the tongs are in position above a mold, air is admitted to the upper end of the cylinder 97 to move the tongs 95 downwardly and effect engagement with the neck of the ware within the mold, whereupon air is admitted to the lower end of the cylinder 97 to raise the tongs, and to the inner end of the cylinder 96 to shift the cylinder 97 outward to a point where the tongs can be lowered to discharge the ware upon a lehr conveyer, or to deposit in the mold of another machine if subsequent forming operations are to be performed, as in the case of forming machines of the two-table type that are well known in the art.

It will be understood that a sufficient number of timing valves 66 will be provided to serve the various operating cylinders of a machine, and that all of these valves operate in predetermined relation to movements of the mold carrier. It will also be seen that although the motor 27 is constantly driven, the rates of movement thereof can be very precisely controlled, so that the duration of the dwell periods or moving periods can be varied to suit conditions. For example, in many cases the dwell period will have to be maintained for a certain duration, while when forming other ware, the duration of dwell can be for a shorter time. By the use of my apparatus, unnecessary consumption of time can be avoided, and furthermore, considerable time can be saved by moving the Geneva gear wheel 12 more rapidly during movement of the table from one dwell position to the next dwell position, instead of having the moving period of as great duration as the dwell period, as has been common in the art. A greater number of articles of ware can thus be turned out per minute.

In Figs. 5, 6 and 7 I show another form of apparatus whereby the Geneva pinion 13 can be turned at varying rates of speed during each revolution thereof. A shaft 100 on which the pinion 13 is mounted carries an elliptic gear wheel 101 which meshes with an elliptic gear wheel 102 that is mounted upon a shaft 103. The shaft 103 carries a worm gear 104 that is driven by a worm 105 that is on a worm shaft 106 which is driven by a motor 107 through suitable reduction gearing. The shaft 106 carries a bevel gear wheel 108 that meshes with a bevel gear wheel 109 that through a shaft 110 and reduction gearing 111 drives a bevel gear pinion 112. The pinion 112 drives a bevel gear wheel 113 that is secured to a timer shaft 114 which corresponds to the timer shaft 34 of Fig. 1.

As shown in Figs. 5 and 6, the gear wheel 102 has teeth on its small radius portion meshing with the teeth on the larger radius portion of the gear wheel 101, the arcuate portion 18 of the Geneva pinion being in one of the curved recesses 19, so that the Geneva is at a dwell point and glass-forming operations are being performed, this dwell period being thereby prolonged relative to the movement period which is shown as occurring in Fig. 7.

In Fig. 7 the large radius portion of the gear wheel 102 has engagement with the small radius portion of the gear wheel 101, while the driving tooth 16 of the Geneva pinion is in one of the slots 17 of the Geneva gear, and consequently is turning the table. The movement of the Geneva pinion 13 is therefore quite rapid at this time, when no glass-shaping operations are being performed.

Variations in rates of movement of the pinion 13 during each rotative cycle thereof can be varied by adjusting the gear wheels 101 and 102 circumferentially of their respective shafts, keys 116 and 117 and key slots 118 being provided for this purpose. It will be understood that the timer shaft 114 will control the operation of the various glass-forming elements as in the case of the timer shaft 34 of Fig. 1.

Referring now to Figs. 8 and 9 I show therein a modification of the apparatus of Fig. 1 in that it discloses a somewhat different means for varying the speed of the motor during each cycle of movement of the timer shaft 34. In this modified arrangement, the motor 120 that serves to drive the apparatus, as does the motor 25, is of the A. C. type, in which the speed is changed by shifting brushes 121 along the commutator segments 122, as is well known in connection with the operation of motors of this type, including D. C. motors.

A cam ring 123 has a cam slot 124 and is mounted on the timer shaft 34. A slide bar 125 is slidably supported in guideways 126 and has a stud that extends into the cam slot 124, so that as the timer shaft rotates, the bar 125 is reciprocated. At its outer end, the bar 125 is provided with arms 127 and 128. The arm 127 is here shown as connected to a rocking lever 129 by a pin 130 that extends through the arm and through a slot at the upper end of the lever 129. At its lower end, the bar 129 carries a ring or collar 131 disposed circumferentially of a ball race 132 that snugly fits upon the inner end of a bearing 133 for the motor shaft. The four brush holders 134 are connected to the ring 131, so that when the lever 129 is oscillated about the axis of the motor shaft, the brush holders 134 and the brushes 121 will periodically be shifted circumferentially of the commutator 122, to thereby vary the speed of the motor 120. In other words, the speed of the motor 120 will be varied in predetermined relation to the operation of the timer shaft, to effect fast and slow movements of the mold table, as is the motor 25.

A different range of speed variation can be effected simply by moving the pin 130 from the arm 127 into the hole 135 of the arm 128. In the latter case, the lever 129 will, of course, be swung through a longer arc and the speed range will be within wider limits. It will be understood that the electromagnetic brake and the Geneva drive will be incorporated with the driving motor and control apparatus of Figs. 8 and 9, as in the apparatus of Fig. 1.

I claim as my invention:

1. Glass-forming apparatus comprising a rotatable mold carrier, means operating in timed relation to movement of the carrier, for performing glass-shaping operations in the molds, an electric motor for driving the table, normally operating at a predetermined rate, means periodically effective to vary the speed at which the motor operates, at various stages during each revolution of the carrier, a brake for retarding the motor and means for automatically and momentarily applying the brake when the speed of the motor is to be reduced, in predetermined relation to the glass-shaping operations.

2. The combination with a rotatable carrier, of means for rotating the carrier intermittently, with pauses of uniform duration, means operable at predetermined points during pauses in movement of the carrier for performing operations on bodies supported upon the carrier, a timing device for controlling said operations, a driving device for the carrier and for said timing device, and means automatically operable to so vary the speed of said driving device that it will move at one rate during said operations and at another rate during the periods at which the said bodies are not being operated upon.

3. The combination with a rotatable carrier, of a Geneva drive for imparting intermittent rotative movements to the carrier, a driving member for the Geneva pinion, means for performing operations on bodies supported upon the carrier during pauses in its movement, a timing device for controlling the performance of said operations in predetermined relation to the movement of the driving member, and means effective at recurring intervals to vary the rate at which the driving member is operated, the said means comprising an elliptic gear drive.

4. The combination with a carrier and means operable to perform operations upon bodies supported on the carrier, of a constantly-moving drive shaft for the carrier, a timer driven from said shaft and controlling recurrent operations of said means, and a variable speed device interposed between the said shaft and the carrier, for moving the carrier at predetermined different rates of speed during rotation of the shaft at any given speed, the said means comprising a gear train which includes intermeshing elliptical gears, that are adjustable about their respective axes.

5. Glass-forming apparatus comprising a rotatable mold carrier, means for intermittently rotating the carrier, a constantly-driven member for driving said means, means operating in timed relation to movement of the carrier, for performing glass shaping operations in the molds, an electric motor for driving the said constantly-driven member and normally operating at a predetermined rate, means periodically effective to vary the speed at which the motor operates, at various stages of each revolution of the carrier, a brake for retarding the motor, and means for automatically and momentarily applying the brake when the speed of the motor is to be reduced, in predetermined relation to the glass-shaping operations.

6. Glass-forming apparatus comprising a rotatable mold carrier, means intermittently operable in timed relation to movement of the carrier, for performing glass-shaping operations in the molds, a driving element, a Geneva drive driven by said element, for imparting intermittent rotative movements to the carrier, means for so timing the glass-shaping operations that they occur during pauses in carrier movement, and means operating in timed relation to the glass-shaping means, for moving the driving member of the Geneva drive at variable speeds during each cycle of pause and movement of the carrier.

7. The combination with a rotatable mold carrier, of a Geneva drive for imparting intermittent rotative movements to the carrier, a driving member for the Geneva pinion, means for performing glass-shaping operations in the molds during pauses of the carrier, a timing device for controlling the performance of said operations in predetermined relation to the movement of the driving member, means effective at recurring intervals to vary the rate at which the driving member is operated, the said means comprising an electric motor moving at such rate that each cycle of pause and movement that occurs during each complete rotation of the carrier is of uniform duration, and means automatically operable in predetermined relation to movement of the driving member for varying the speed of the motor during each cycle.

8. Glass-forming apparatus comprising a rotatable mold carrier, means for imparting intermittently rotative movements to the carrier, means operating in timed relation to movement of the carrier, for performing glass-shaping operations in the molds during pauses of the carrier, a driving device for the carrier, normally operating at such rate that each cycle and pause of movement of the carrier during a complete rotation thereof is of uniform duration, and means periodically effective to vary the speed at which the said device operates, at various stages during each cycle of pause and movement of the carrier, the last-named means comprising a gear train which includes intermeshing elliptical gears.

9. Glass-forming apparatus comprising a rotatable mold carrier, means intermittently operable in timed relation to movement of the carrier, for performing glass-shaping operations in the molds, a constantly-moving driving element, a Geneva drive driven by said element, for imparting intermittent rotative movement to the carrier, means for so timing the glass-shaping operations that they occur during pauses in carrier movement, and means operating in timed relation to the first-named means, for moving the driving element at a faster rate in the interval between said pauses than during the shaping operations.

SAMUEL D. BERT.